(12) United States Patent
Kleo

(10) Patent No.: US 8,341,272 B2
(45) Date of Patent: Dec. 25, 2012

(54) METHOD FOR IMPROVING A TCP DATA TRANSMISSION IN CASE THE PHYSICAL TRANSMISSION MEDIUM IS DISCONNECTED

(75) Inventor: Remi Kleo, Bornheim (DE)

(73) Assignee: T-Mobile International AG, Bonn (DE)

( * ) Notice: Subject to any disclaimer, the term of this patent is extended or adjusted under 35 U.S.C. 154(b) by 205 days.

(21) Appl. No.: 12/530,276

(22) PCT Filed: Feb. 28, 2008

(86) PCT No.: PCT/EP2008/001585
§ 371 (c)(1),
(2), (4) Date: Dec. 21, 2009

(87) PCT Pub. No.: WO2008/107115
PCT Pub. Date: Sep. 12, 2008

(65) Prior Publication Data
US 2010/0115102 A1 May 6, 2010

(30) Foreign Application Priority Data
Mar. 7, 2007 (DE) .......................... 10 2007 011 071

(51) Int. Cl.
*G06F 15/16* (2006.01)
(52) U.S. Cl. .................... 709/227; 709/228; 709/250
(58) Field of Classification Search .................. 709/227, 709/228, 250
See application file for complete search history.

(56) References Cited

U.S. PATENT DOCUMENTS

| 7,007,107 | B1 * | 2/2006 | Ivchenko et al. ............. 709/250 |
| 7,177,300 | B2 | 2/2007 | Murakami et al. |
| 2003/0095537 | A1 | 5/2003 | Murakami et al. |
| 2003/0117974 | A1 | 6/2003 | Kang |
| 2005/0180327 | A1 | 8/2005 | Banerjee et al. |
| 2006/0067222 | A1 | 3/2006 | Endoh |

FOREIGN PATENT DOCUMENTS
EP 1 278 348 1/2003

OTHER PUBLICATIONS
Examination Report dated Nov. 13, 2007 from German Patent and Trademark Office in corresponding German Application No. 10 2007 011 071.7.

(Continued)

*Primary Examiner* — Adnan Mirza
(74) *Attorney, Agent, or Firm* — Faegre Baker Daniels LLP

(57) ABSTRACT

A method for the improvement of a TCP data transmission process in the case of an interruption of the physical transmission medium, wherein after the establishment of a TCP connection between a client (10) and a server (12) a data packet is transmitted from the server (12) to the client (10), wherein the receipt of the data packet from the server (12) is confirmed by the client (10) by the transmission of a confirmation message assigned to the received data packet, ACK message, wherein in the case of the transmission of the ACK message at the client (10) a timer (14) is started with a default time T1, and the same ACK message is repeatedly transmitted to the server (12), in case no further data packet has been received from the server (12) at the client (10) after expiration of the time T1.

20 Claims, 3 Drawing Sheets

OTHER PUBLICATIONS

Dongwook, Lee et al., "Delayed-Duplicated ACK (DDS) Algorithm to TCP Performance Enhancement to Overcome Packet Sequence Disruption in Fast-handoff of Mobile IPv6", Distributed Computing Systems Workshops, 2004. 24th International Conference, Hachioji, Japan, Mar. 23-24, 2004.

YuChul, Kim et al., "Considering Spurious Timeout in Proxy for Improving TCP Performance in Wireless Networks", Globecom 2003—IEEE Global Telecommunications Conference, San Francisco, CA, Dec. 1-5, 2003.

* cited by examiner

ESTABLISHMENT OF A TCP CONNECTION

METHOD FOR IMPROVING A TCP DATA TRANSMISSION IN CASE THE PHYSICAL TRANSMISSION MEDIUM IS DISCONNECTED

CROSS-REFERENCE TO RELATED APPLICATION

This application is related to and claims the benefit under 35 U.S.C. §119 and 35 U.S.C. §365 of International Application No. PCT/EP2008/001585, filed Feb. 28, 2008.

The invention relates to a method for the improvement of a TCP data transmission process in the case of an interruption of the physical transmission medium.

Nowadays the Transmission Control Protocol (TCP) is often used together with the Internet Protocol (IP) by many data communication applications, e.g. in the case of Internet connections or e-mail.

TCP is an agreement (protocol) about how data are to be exchanged between communications partners, usually computers. All operating systems of modern computers are proficient in TCP and use it for data exchange with other computers. The TCP protocol is a reliable, connection-oriented transport protocol on computer networks. It is part of the Internet protocol family, the foundation of the Internet. In contrast to connection-less UDP (User Datagram Protocol) TCP constitutes a virtual channel between two end points of a network connection (sockets). Data can be transmitted in both directions on this channel. TCP in most cases relies on the IP (Internet Protocol), which is why frequently there is talk of "TCP/IP Protocol". It is located in layer 4 of the OSI reference model.

The quantity of data that are to be transmitted is separated in small packets (IP data packets) and then transmitted. The principles which are defined in the TCP Standard ensure that IP packets which are lost during the transmission and not acknowledged are repeatedly transmitted.

As shown in FIG. 2, the TCP principles see to it that the connection between a data retrieving device, a so-called client 10, and a data-providing device, a so-called server 12, takes place. The client 10 initiates the connection and retrieves the data from the server 12. The server 12 makes the data available and sees to it that all data packets are transmitted to the client 10. To establish a connection the client 10 first transmits a request message, SYN, to the server 12. The server 12 answers with a confirmation message SYN ACK. The client 10 then likewise sends a confirmation message ACK. In the establishment of a TCP connection a so-called three-way handshake is used. The communication partner who wants to establish the connection, here the client 10, sends the other a SYN packet (from synchronize) with a sequence number. The sequence numbers are in the process important for the backup of a complete transmission in the correct sequence and without duplicates. It is a matter of a packet whose SYN bit is set in the packet header. The start sequence number is any—usually randomly selected number whose generation is dependent on the respective TCP implementation.

The destination device, here server 12, receives the packet and sends in a separate SYN packet in return its start sequence number, which is likewise random and independent from the start sequence number of the client 10. At the same time said server confirms receipt of the first SYN packet by increasing the sequence number of the client by one and sending it back in the ACK part (acknowledgement) of the header. The client 10 finally confirms the receipt of the SYN ACK packet by sending its own ACK packet to the server. This process is also referred to as "forward acknowledgement". The connection is therewith established.

At this time the connection is established and the server sends a predefined number of data packets to the client. The number of data packets was negotiated earlier during the establishment of a connection between client and server. After the transmission of the data packets, here data n and data n+1, the client 10 responds with an additional "ACK" message, here ACK n+2, and with this gives the information as to which data packets he expects as next. The server 12 waits for this "ACK n+2" message of the client. When the "ACK n+2" message is received at the server, the server transmits the next data packets to the client 10.

In FIGS. 3 and 5 the case of an interruption of the TCP connection is represented. If for example the "ACK n+2" is not received by the server 12 within a predefined waiting period Tw, said server again transmits the last data packet, which was not acknowledged by the client, thus in the example the data n+1. This procedure consisting of waiting and if necessary repeatedly sending the data packets is repeated several times. The waiting period of the client 10 for the data grows with the number of repetitions. Typically the server 12 waits a few seconds at the beginning (for example 2-3 seconds) for the "ACK n+2". The waiting period Tw is then increased by circa one minute, since the waiting period as a rule is doubled between two repetitions.

FIG. 4 shows the controlled disconnection, which takes place similar to the establishment of a connection. Instead of the SYN bit the FIN bit (finish) is used, which indicates to the client 10 that no more data are coming from the server 12. The receipt of the packet is in turn confirmed on the part of the client 10 by means of ACK. The recipient of the FIN packet finally sends for his part a FIN packet, which is also confirmed to him.

Although actually four ways are used, in the case of the disconnection it is a matter of a three-way handshake, since the ACK and FIN operations from the server to the client are classified as one way. In addition a shortened method is possible, in which case the FIN and ACK are housed in the same packet precisely as in the case of the establishment of a connection. The maximum segment lifetime (MSL) is the maximum amount of time that a segment can spend on the network before it is discarded.

When a communication subscriber uses an application for data communication, e.g. e-mail, on a mobile communications network, the probability that the data connection will be interrupted is much greater than for example in the case of a data connection via a fixed network. When the data connection on the mobile communications network is interrupted, the data connection remains interrupted until the repetition procedure of TCP is again effective and the data transmission is repeated, even if the physical channel is immediately available again after the interruption.

It is the object of the invention to specify a method for the improvement of a TCP data transmission process in the case of an interruption of the physical transmission medium transmission medium. As a result the resumption of the TCP connection in the case of an interruption of the physical medium should be reduced.

This task is solved in accordance with the invention by the features of Claim 1.

Preferred embodiments and additional, advantageous features of the invention are specified in the dependent claims.

In accordance with the invention in the case of the transmission of the ACK message a timer is started with a default time T1 at the client and the same ACK message is repeatedly transmitted to the server in case after the expiration of the time T1 no additional data packet was received at the client from the server.

The invention is thus based on the fact that the client recognizes that the flow of data from the server has been interrupted and then tramsmits the last ACK message to the server once more at a relatively high rate of repetition. The server can immediately respond to this and continue the data transmission.

So that a repeated transmission of the same ACK message is possible, provision is made that the client stores each transmitted "ACK" message at least until an ACK message must be sent anew.

In advantageous manner the time T1, that is, the waiting period for data from the server, can be set by the client.

For a trouble-free flow of the connection and disconnection the timer is not activated during the establishment and clearing of a connection.

Moreover provision can be made that the number of repeated transmissions of the same SYN message at the client is counted by means of a counter C1. After the exceeding of a default threshold value no further SYN message of the same content will be sent to the server.

The advantages of the invention are obvious:
After an interruption of the physical medium, up to now the data transfer for the end user remained interrupted until the repetition procedure defined in the TCP Standard was carried out. This takes several seconds. Through the invention, the time for which the data transfer remains interrupted, after the physical medium is again available, is reduced. This time is determined by the value T1 of the timer and can be set by the end user. If the client recognizes the end of the data transfer, the procedure described here above is no longer used by the client.

The device or the method in accordance with the invention can be installed on a proxy on a mobile communications network and be controlled from the mobile communications network.

In the following the invention will be described more closely by means of drawings. Further features and advantages of the invention arise from the drawings and the subsequent description.

FIGS. 2 through 5 have already been described in the introductory part of the description in connection with the state of the art. Reference is made here to the corresponding passages.

Figure 2:
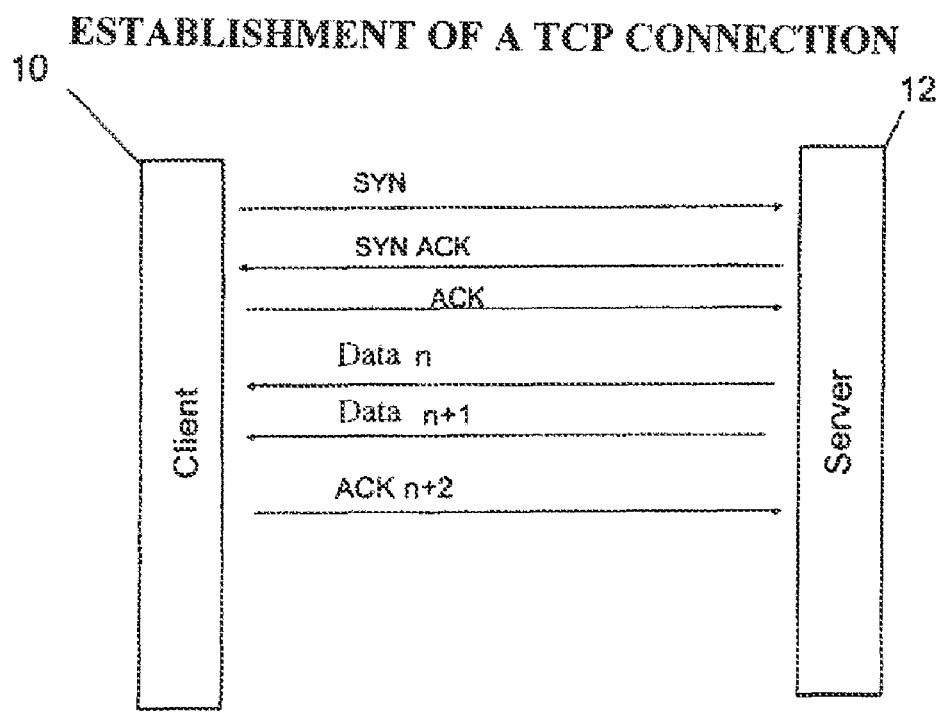
FIG. 2 shows in simplified form the sequence of the establishment of a TCP connection (State of the art).
Figure 3:
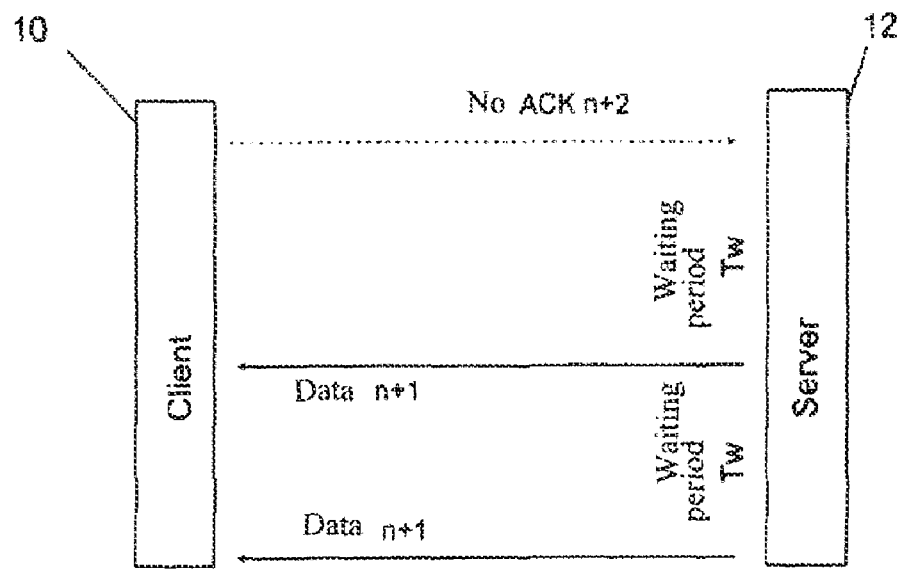
FIG. 3 shows in simplified form the sequence in the case of an interruption of a TCP connection (State of the art).
Figure 4:
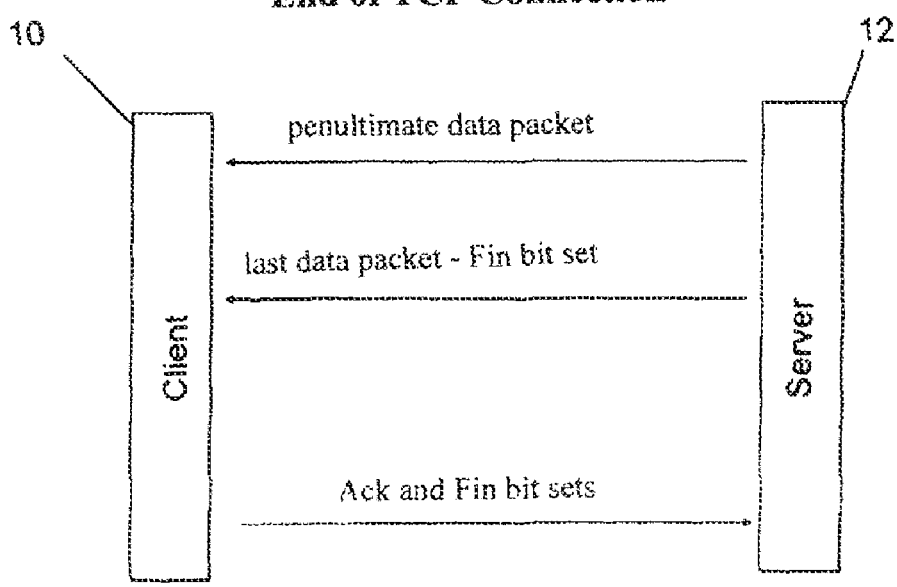
FIG. 4 shows in simplified form the sequence of the clearing of a TCP connection (State of the art).
Figure 5:
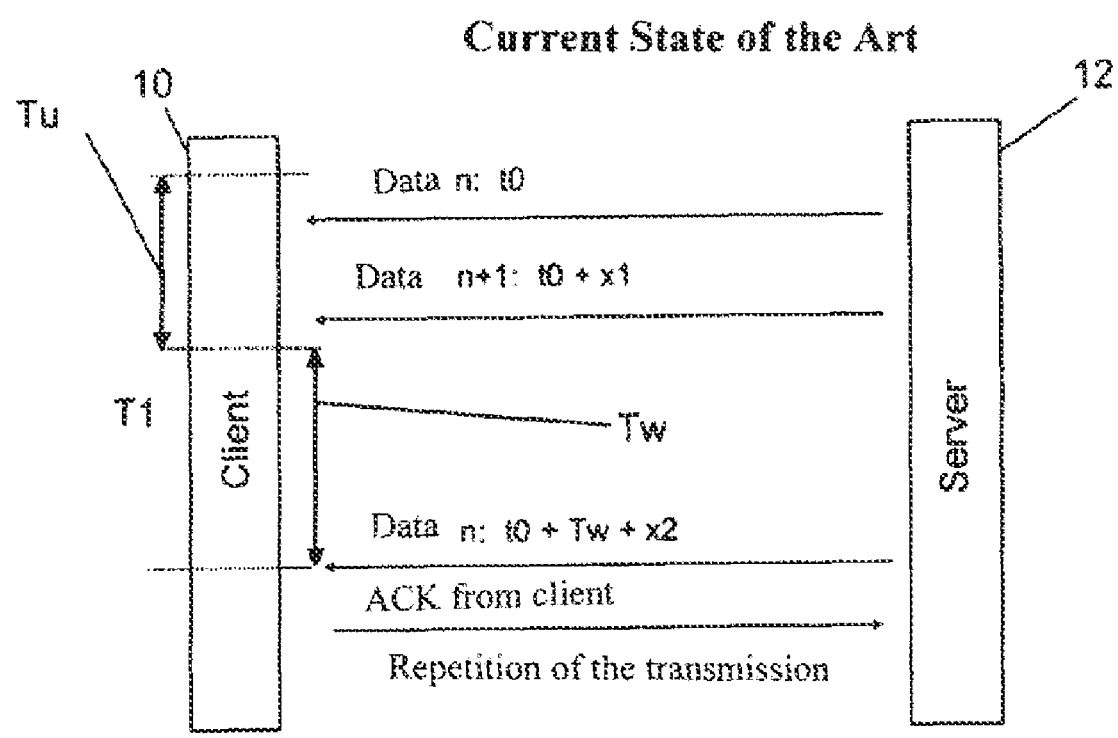
FIG. 5 shows in simplified form the standardized sequence of a TCP data transmission process in the case of an interruption of the physical transmission medium (State of the art).

In the case of the method in accordance with the invention the detection of the establishment and clearing of a connection takes place in unchanged manner, as described further above on the basis of FIGS. 2 and 4. In the TCP standard it is defined that a connection is initiated by the client 10 by the sending of an IP packet, in which case the "SYN" bit is set in the TCP portion. The server 12 then answers with a packet in which the "SYN" and "ACK" bits are set in the TCP portion of the packet. The client 10 then answers with a packet in which the "ACK" bit is set in the TCP portion. When these three messages have been transmitted between the client 10 and the server 12 the actual data transfer can take place.

At the end of the data transfer the server 12 sets a "Fin" bit in the last data packet. The client 10 then transmits an ACK. In order to implement the inventive concept the client uses this information to stop the monitoring of the data transfer. The connection is then ended by default.

Figure 1:
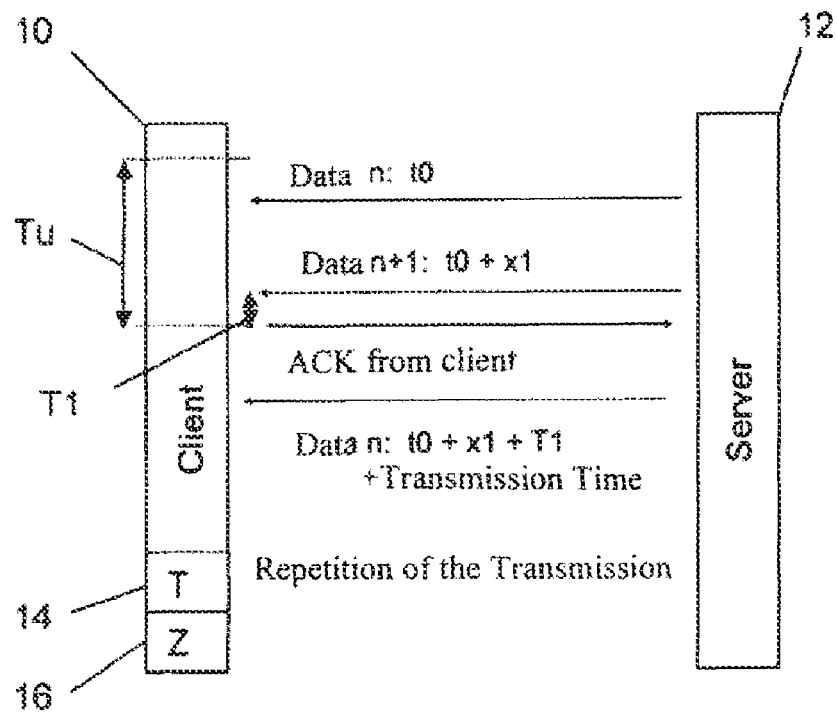
FIG. 1 shows in simplified form the sequence in accordance with the invention of a TCP data transmission process in the case of an interruption of the physical transmission medium.

As one recognizes with the help of FIG. 1, for the purpose of the detection of an interruption of the data flow on the part of the client 10 a timer 14 is installed in accordance with the invention for the monitoring of the connection. The time value T1 of this timer 14 is adjustable. The timer 14 is used only during the actual data transfer and not during the connection and disconnection phases of the connection.

The timer 14 is started as soon as the establishment of the connection has been confirmed on the part of the client 10 with the message "ACK" and is stopped when data following the ACK message from the server 12 are received.

If no data (here data n+1) have been received from the server 12 within the time T1, the client 10 assumes that the data flow has been interrupted and triggers a predefined action. In accordance with the invention the client 10 stores each "ACK" transmitted to the server 12 at least until further data from the server 12 are received again and a new ACK message must be sent.

The predefined action of the client 10 in the case of an interruption of the data flow serves the purpose of a rapid resumption of the connection. In the case of the sending of a "new" ACK message the earlier stored ACK message is deleted and replaced by the new one. If the client 10 has noticed that the data flow (data n+1) has been interrupted because T1 has expired without data from the server 12 being received, the client 10 transmits the last stored "ACK" message once more to the server 12 and in turn waits the period of time T1 to determine whether data are received from the server 12.

Additionally a counter 16 can be implemented at the client 10 in order to count how often the same ACK message is sent to the server 12 in the case of an interruption of the data transfer. If the counter 16 reaches a specified threshold value, the client 10 stops the repeated transmission of the ACK message. The conventional TCP standard is then applied.

The invention claimed is:

1. A method for the improvement of a TCP data transmission process in a mobile communications network, wherein after the establishment of a TCP connection between a client and a server a data packet is transmitted from the server to the client, wherein the receipt of the data packet from the server is confirmed by the client by the transmission of a confirmation message assigned to the received data packet (ACK message), the method comprising:
at the time that the ACK message is transmitted by the client, starting a timer with a default time T1;
the client repeatedly transmitting to the server the same ACK message in the case where no further data packet has been received from the server after the expiration of the time T1; and
the client storing each transmitted ACK message at least until an ACK message must be sent again;
whereupon exceeding of a default threshold value no further ACK message of the same content will be sent to the server;
the timer not being activated during the establishment and clearing of a connection between the client and server.

2. The method according to claim 1, wherein time T1 is set on the part of the client.

3. The method according to claim 1, wherein the default threshold value is a predetermined number of repeated transmissions of the same ACK message counted at the client by means a counter, and upon the exceeding of the counter default threshold value no further ACK message of the same content will be sent to the server.

4. The method according to claim 1 executed on a proxy on a mobile communications network and controlled from the mobile communications network.

5. A device carrying out the method for the improvement of a TCP data transmission process in the case of the interruption of the physical transmission medium according to claim 1, including a timer installed at the client for the recording of an interruption of the data transmission from the server.

6. The device according to claim 5, including a counter set up at the client for the counting of the ACK messages of the same content transmitted to the server.

7. The device according to claim 5, installed on a proxy on a mobile communications network and controlled from the mobile communications network.

8. A data processing program with a program code which executes the method according to claim 1 on a data processing device.

9. A data processing program product which comprises a program code executable on a data processing device for carrying out the method according to claim 1.

10. The method according to claim 2, wherein the default threshold value is a predetermined number of repeated transmissions of the same ACK message counted at the client by means a counter, and upon the exceeding of the counter default threshold value no further ACK message of the same content will be sent to the server.

11. The method according to claim 2, installed on a proxy on a mobile communications network and controlled from the mobile communications network.

12. The method according to claim 3, installed on a proxy on a mobile communications network and controlled from the mobile communications network.

13. A device carrying out the method for the improvement of a TCP data transmission process in the case of the interruption of the physical transmission medium according to claim 2, including a timer installed at the client for the recording of an interruption of the data transmission from the server.

14. A device carrying out the method for the improvement of a TCP data transmission process in the case of the interruption of the physical transmission according to claim 3, including a timer installed at the client for the recording of an interruption of the data transmission from the server.

15. A device carrying out the method for the improvement of a TCP data transmission process in the case of the interruption of the physical transmission medium according to claim 4, including a timer installed at the client for the recording of an interruption of the data transmission from the server.

16. The device according to claim 6 installed on a proxy on a mobile communications network and be controlled from the mobile communications network.

17. A data processing program with a program code which executes the method according to claim 2 on a data processing device.

18. A data processing program with a program code which executes the method according to claim 3 on a data processing device.

19. A data processing program with a program code which executes the method according to claim 4 on a data processing device.

20. A data processing program product which comprises a program code executable on a data processing device for the carrying out of the method according to claim 2.

* * * * *